United States Patent [19]

Krol

[11] Patent Number: 5,031,864
[45] Date of Patent: Jul. 16, 1991

[54] MULTI-USE CLAMP FOR ELECTRICAL CONDUITS

[75] Inventor: Harry J. Krol, Arlington Heights, Ill.

[73] Assignee: King Koral, Inc., Arlington Hts., Ill.

[21] Appl. No.: 477,025

[22] Filed: Feb. 8, 1990

[51] Int. Cl.$^5$ .............................................. F16L 3/00
[52] U.S. Cl. ..................................... 248/71; 248/74.5; 248/912; 411/920
[58] Field of Search ................. 248/71, 74.5, 66, 68.1, 248/65, 74.1, 49, 912; 174/164, 159; 411/920, 470, 473, 475, 457

[56] References Cited

U.S. PATENT DOCUMENTS

| | | | |
|---|---|---|---|
| 1,914,256 | 6/1933 | Holmes | 248/71 X |
| 2,681,196 | 6/1954 | Lind | 248/71 |
| 2,747,821 | 5/1956 | Falk | 248/71 |
| 2,885,168 | 5/1959 | Silverman | 248/71 |
| 2,913,204 | 11/1959 | Stewart | 248/71 |
| 3,430,903 | 3/1969 | Mathes | 248/71 X |
| 4,826,111 | 5/1989 | Ismert | 248/49 |

FOREIGN PATENT DOCUMENTS

| | | | |
|---|---|---|---|
| 515183 | 4/1931 | Fed. Rep. of Germany | 248/71 |
| 58221 | 9/1946 | Netherlands | 248/74.5 |
| 0162789 | 1/1955 | Netherlands | 248/74.5 |

Primary Examiner—Karen J. Chotkowski
Attorney, Agent, or Firm—Charles F. Lind

[57] ABSTRACT

The disclosed multi-use clamp consists of a unitary body having an elongated pointed shank and a hook cantilevered off of the shank opposite the pointed end. The hook has first and second concavely curved portions located outwardly adjacent the shank. These curved portions having curvatures corresponding to the outside surface of two differently sized conventional conduits, and the centers of these respective curvatures are spaced from the shank a distance corresponding to the curvature itself. A commercial version of the clamp would have the curvature of the inner curved portion correspond to a ½" size conduit, and would have the curvature of the outer curved portion correspond to a ¾" size conduit. The clamp can thus be used with either size conduit, being driven into and be rigidly secured to a support structure, with the hook overlying the conduit for holding it relative to the support structure.

16 Claims, 1 Drawing Sheet

MULTI-USE CLAMP FOR ELECTRICAL CONDUITS

BACKGROUND OF THE INVENTION

In the electrical industry, it is common to run ground wires and/or electrical wires housed in conduits along and against support surfaces, and to use clamps as one means for securing them relative to these support surfaces. When the support is formed of wood, concrete, masonry or the like, the clamps can be formed of reasonably strong metal structures and can be driven directly into the support to become rigidly connected thereto. The clamp may further snuggly overlie the conduit or ground wire for holding the same tightly against the underlying support surface.

One form of clamp may be as a U-shaped staple, having two generally parallel shank portions and a curved interconecting cross portion. The spacing of the shank portions is selected to fit on opposite sides of the electrical conduit or ground wire; and these shank portions are pointed at their free ends adapted to be driven into the structural support until the interconnecting cross portion fits snuggly against the electrical conduit or ground wire.

Another form of clamp may be somewhat J-shaped, having a shank portion with one pointed end and having a hook portion cantilevered off of the shank portion near its opposite end. The shank portion is adapted to be driven into the structural support next to the electrical conduit or ground wire; and the hook portion is adapted then to overlie and be snugged against the electrical conduit or ground wire.

In each general type, the clamp is sized to fit or cooperate with one size of electrical conduits, which most commonly may come as a ½" or ¾" size conduit. Thus, with the U-shaped staples, the shank portions may be spaced apart by the needed distance, and the interconnecting cross portion may be curved between these shank portions at a curvature corresponding generally to the outside of either the ½" or ¾" size conduit. Likewise, the hook portion of the J-shaped clamps may be shaped to engage the outside of either the ½" or ¾" size conduit.

One problem with this approach is the increased needed inventory of different staples and clamps suited to cooperate properly with each common size of conduit.

SUMMARY OF THE INVENTION

This invention relates to a J-shaped type clamp, and an object of this invention is to provide a clamp with an improved hook having spaced curved portions respectively adapted to cooperate with electrical conduits of different common sizes, thereby reducing the inventory needs of its user.

BRIEF DESCRIPTION OF THE DRAWINGS

Further objects and advantages of the this invention will appear from the following disclosure and description, including as a part thereof the accompanying drawing, in which.

DETAILED DESCRIPTION OF AN ILLUSTRATED EMBODIMENT

Figure 1:
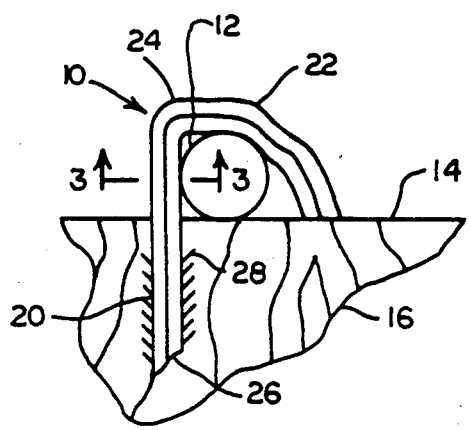
FIG. 1 is an elevational view of the improved clamp operatively holding a typical conduit against a structural support, the view looking axially of the conduit and being illustrated somewhat in section for clarity of the disclosure.
Figure 2:
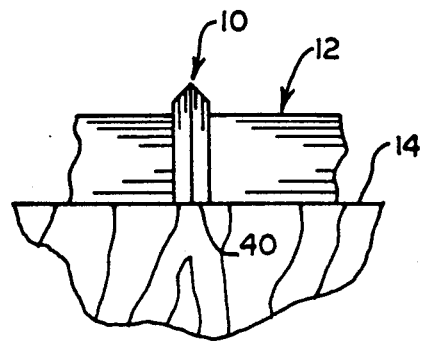
FIG. 2 is a side elevational view of the clamp and conduit illustrated in FIG. 1.

FIGS. 1 and 2 show the improved multi-use clamp 10 in operative association holding a conduit 12 against the surface 14 of a structural support 16. It will be appreciated that the support 16 can be part of wooden stud or framing or wall of a building or the like, or can be concrete, masonry or the like, such that the clamp can be driven into the structure.

The clamp 10 is formed as a unitary body, having a shank 20 and a hook 22 cantilevered off of the shank 20 near one end 24 thereof. The shank 20 is elongated and has a sharp point at its end 26 opposite the hook 22, adapted to be driven into the support structure 16 tangentially adjacent the conduit 12 to be rigidly secured relative to the support structure. The hook 22 overlies and fits snuggly against the conduit 12, and this serves to hold the conduit snugged against the support surface 14.

The shank 20 and hook 22 generally lie in a single plane, and the clamp is adapted to cooperate with the held conduit 12 so that this plane would typically end up substantially perpendicular to the length of the conduit.

Barbs 28 may be formed on the shank 20, for improving the ability of the shank when once driven into the structural support 16 of being axially held there within.

Figure 4:
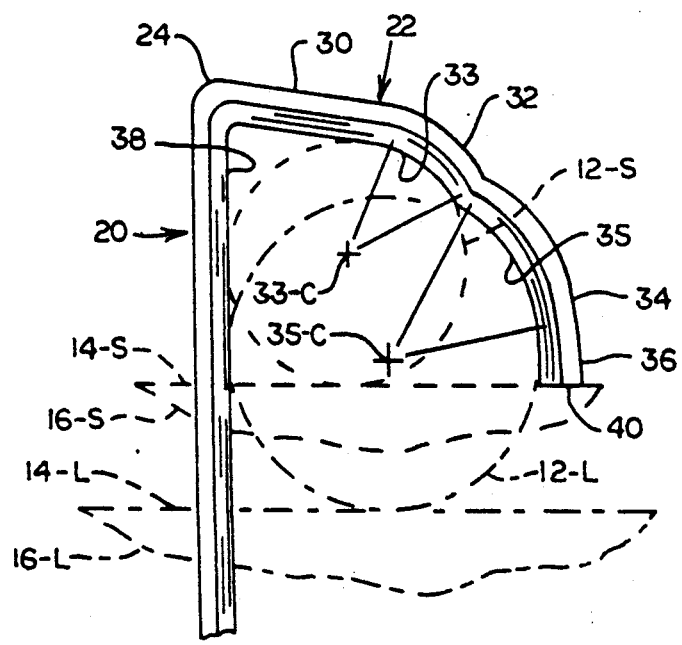
FIG. 4 is an enlarged view of the clamp of FIG. 1, showing additional details thereof and how the clamp is suited to cooperate with conduits of different sizes.

FIG. 4 shows the same multi-use clamp 10 greatly enlarged, and shows in phantom how it functions to hold different typically sized electrical conduits 12-S and 12-L relative to the support structures 16-S and 16-L respective. It can be appreciated that the support surfaces 16-S and 16-L would in fact be the same, but as the different conduits 12-S and 12-L engage the clamp 10 and the surfaces 16-S and 16-L at slightly different locations, different numbers are being used for them for clarity of the disclosure.

The hook 22 actually has a substantially straight inner portion 30 immediately adjacent the shank; a first concavely curved portion 32 outwardly adjacent the straight portion 30; a second concavely curved portion 34 outwardly adjacent the first concavely curved portion 32; and a substantially straight outer portion 36 outwardly adjacent the second concavely curved portion 34.

The first curved portion 32 has a concave curvature at face 33 corresponding to the outside surface of the conduit 12-S, and the second curved portion 34 has a concave curvature at face 35 corresponding to the outside surface of the larger conduit 12-L.

The center 33-C of the curved face 33 on the first curved portion 32 is spaced from the near surface 38 of the shank 20 a distance approximately that of the first section curvature itself; or approximately one-half the OD of the conduit 12-S.

The center 35-C of the curved face 35 on the second curved portion 34 is spaced from the near surface 38 of the shank 20 a distance approximately that of the second section curvature itself; or approximately one-half the OD of the conduit 12-L.

In a preferred commercial utilization of this invention, the curvature of face 33 on the first curved section 32 would corresponds to the outside curvature of a ½" size conduit, and the curvature of face 35 on the second curved section 34 would corresponds to the outside curvature of a ¾" size conduit.

The substantially straight outer portion 36 is angled slightly out of parallel with the shank 20, by only a few degrees. Also, the hook end 40 will be at the approximate location where the support surface 14-S will be when the clamp is fitted over the smaller conventional conduit 12-S. As measured in the direction of the shank 20, this will be spaced from the center 33-C of the curved face 33 on the first portion 32, a distance approximately that of the first section curvature itself or approximately one-half the OD of the conduit 12-S.

Figure 3:
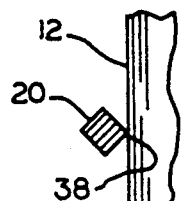
FIG. 3 is a sectional view taken generally from line 3—3 in FIG. 1.

Also in a preferred commercial utilization of this invention, the cross-section of the unitary body would be substantially symmetrical axially of the body, and of a multi-sided, multi-cornered shape. This may be of a triangular shape, or of a square shape as illustrated in FIG. 3. Further, the unitary body would be bent to the desired clamp shape by bending it across one pair of the corners, to have one of the body corners disposed adjacent the conduit and serving as the contacting surfaces 33, 35 and 38 of the clamp.

Thus, when the clamp 10 is operatively snugged against the conduit 12, the conduit is thus held along three spaced locations: by the near side corner 38 at the shank 20; by the respective engaged curved face 33 or 35; and by the support surface 14-S or 14-L. The corner cooperation of the clamp may tend to dig into the conduit slightly as the clamp is driven against the conduit, to hold the conduit against movement.

In actual practice, in securing a typical conduit of an elongated configuration, several clamps will be used at axially separated locations along the conduit.

Still further in a preferred commercial utilization of this invention, the substantially straight portion 30 of the hook 22 immediately adjacent the shank 20 and between the first concavely curved section 32 and the shank is angled relative to the shank slightly in excess of a right angle. Thus, the high point of the unitary clamp body is at the one end 24 of the shank 20 and is substantially on and coaxially of the shank 20. This allows the clamp to be driven by a hammer or like tool coaxially of the shank and into the surutural support 16, without bending the hook 22 significantly out of its designed configuration.

The unitary clamp body may be made of a structural material, such as steel; and it may further be heat treated for added strength and durability. For improved durability against corrosion, the body may be zinc plated; or to meet specific code standards, it may be hot-dipped galvanized.

Although the disclosed clamp physically would be effective for holding both ground wires and/or conduits, existing local utility and/or building codes may limit its use to certain applications: be it for outdoor or indoor use and/or use by an electrical utility or a licensed house builder. Correspondingly, the following claims mention the multi-use clamps being for holding electrical conduits, although ground cables or the like could also be held.

Also, while only a single embodiment of the invention has been illustrated, it is apparent that variations may be made therefrom without departing from the inventive concept. Accordingly, the invention is to be limited only by the scope of the following claims.

What is claimed as my invention is:

1. A multi-use clamp for optionally holding either of two conventionally sized larger and smaller diameter electrical conduits relative to a support structure, comprising the combination of a unitary body having a shank and a hook cantilevered off of the shank near one end thereof and away from a near side thereof;

said shank being substantially straight and elongated and pointed at its end opposite the hook;

said hook having a first concavely curved portion outwardly adjacent the shank and a second concavely curved portion outwardly adjacent the first concavely curved portion, and each curved portion having a center of curvature and radius and being located on the side of its respective center remote from the shank near side, as measured in the direction normally away from the shank near side;

the first curved portion having a curvature corresponding to the outside surface of the smaller of the conduits, and the second curved portion having a curvature corresponding to the outside surface of the larger of the conduits wherein each center of curvature is located a distance from the shank approximately equal to the length of each respective radius; and the clamp in use having its shank driven into and rigidly secured to the support structure, with the shank near side tangentially adjacent and contacting the outside surface of the conduit and with the respective curved portion overlying and contacting the outside surface of the conduit, for a two-point wedged containment of the conduit against the support structure.

2. A multi-use clamp according to claim 1, further wherein the center of curvature of the first curved portion is spaced from the shank near side a distance approximately that of the radius of curvature of the first curved portion or one-half the outer diameter of the smaller conduit.

3. A multi-use clamp according to claim 1, further wherein the center of curvature of the second curved portion is spaced from the shank near side a distance approximately that of the radius of curvature of the second curved portion or one-half the outer diameter of the larger conduit.

4. A multi-use clamp according to claim 1, further wherein the center of curvature of the first curved portion is spaced from the shank near side a distance approximately that of the radius of curvature of the first curved portion, and further wherein the radius of curvature of the first curved portion corresponds to one-half the outer diameter of a conventional ½" size electrical conduit.

5. A multi-use clamp according to claim 1, further wherein the center of curvature of the second curved portion is spaced from the shank near side a distance approximately that of the radius of curvature of the second curved portion, and further wherein the radius of curvature of the second curved portion corresponds to one-half the outer diameter of a conventional ¾" size electrical conduit.

6. A multi-use clamp according to claim 1, further wherein the center of curvature of the first curved portion is spaced from the shank near surface a distance approximately that of the radius of curvature of the first curved portion, and further wherein the center of curvature of the second curved portion is spaced from the shank near surface a distance approximately that of the radius of curvature of the second curved portion.

7. A multi-use clamp according to claim 6, further wherein the radius of curvature of the first curved portion corresponds to one-half the outer diameter of a conventional ½" size electrical conduit, and further wherein the radius of curvature of the second curved portion corresponds to one-half the outer diameter of a conventional ¾" size electrical conduit.

8. A multi-use clamp according to claim 1, further wherein the cross-section of the unitary body is substantially symmetrical axially of the body and is multi-sided and multi-cornered, and further wherein the unitary body is bent to provide that one of the body corners defines said shank near side adapted operatively to be disposed adjacent and against said held conduit.

9. A multi-use clamp according to claim 1, wherein said hook further has a substantially straight portion immediately adjacent the shank and between the shank and first curved portion, and wherein said substantially straight portion is angled, away from the linear extension of the shank, slightly in excess of a right angle, whereby the unitary clamp has high point disposed substantially axially of the shank at the end of the shank adjacent the hook for striking with a tool when being driven into and rigidly secured to the support structure.

10. A multi-use clamp according to claim 1, further wherein the hook has a free end terminating at a location adapted operatively to be disposed closely adjacent or contacting the support surface when the clamp is fitted over and operatively holding the smaller conduit.

11. A multi-use clamp according to claim 1, further wherein the center of curvature of the first curved portion is spaced from the shank near side a distance approximately that of the radius of curvature of the first curved portion, and further wherein the center of curvature of the second curved portion is spaced from the shank near side a distance approximately that of of the radius of curvature of the second curved portion; and wherein the hook has a free end that terminates substantially at a plane, aligned in the direction normally away from the shank near side and extended through the center of curvature of the first curved portion.

12. A multi-use clamp according to claim 11, further wherein the hook has substantially straight cuter portion angled slightly out of parallel with the shank, by only a few degrees; and the free end of the hook is at the end of this outer portion.

13. A multi-use clamp according to claim 11, further wherein the radius of curvature of the first curved portion corresponds to one-half the outer diameter of a conventional ½" size electrical conduit, and further wherein the radius of curvature of the second curved portion corresponds to one-half the outer diameter of a conventional ¾" size electrical conduit.

14. A multi-use clamp according to claim 13, further wherein the cross-section of the unitary body is substantially symmetrical axially of the body and is multi-sided and multi-cornered, and further wherein the unitary body is bent to provide that one of the body corners defines said shank near side and said curved portions adapted operatively to be disposed adjacent and against said held conduit.

15. A multi-use clamp for optionally holding either of two conventionally sized larger and smaller diameter electrical conduits relative to a support structure, comprising the combination with the larger diameter conduit or the smaller diameter conduit of
  a unitary body having a shank and a hook cantilevered off of the shank near one end thereof and away from a near side thereof;
  said shank being substantially straight and elongated and pointed at its end opposite the hook;
  the clamp in use having its shank driven into and rigidly secured to the support structure, with a shank near side tangentially adjacent and contacting the outside surface of either conduit and with the hook overlying and contacting the outside surface of conduit, independently of the relative size of the conduit;
  said hook having a substantially straight portion immediately adjacent the shank, a first clamping portion outwardly adjacent the substantially straight portion, and a second clamping portion outwardly adjacent the first clamping portion;
  said substantially straight portion being angled, away from the shank, slightly in excess of a right angle, whereby the unitary clamp has a high point disposed substantially axially of the shank at the end adjacent the hook thereof for driving the clamp into the support structure;
  said first clamping portion also being angled relative to the shank and substantially facing the shank, and being spaced from the shank near side a distance greater than one-half but less than the full outer diameter of the smaller conduit, as measured in the direction normally away from the shank near side, whereby said first clamping portion and said shank near side provide a two-point wedged containment of the smaller conduit when driven snug against the support structure; and
  the second clamping portion also being angled relative to and substantially facing the shank, and being spaced from the shank near side a distance greater than one-half but less than the full outer diameter of the larger conduit, as measured in the direction normally away from the shank near side, whereby said second clamping portion and said shank near side provide a two-point wedged containment of the larger conduit when driven snug against the support structure.

16. A multi-use clamp according to claim 15, further wherein the cross-section of the unitary body is substantially symmetrical axially of the body and is multi-sided and multi-cornered, and further wherein the unitary body is bent to provide that one of the body corners defines said shank near side and said clamping portions adapted operatively to be disposed adjacent and against said held conduit.

* * * * *